Sept. 22, 1959   F. W. THURMER   2,905,183
HOP PICKING MACHINE
Filed Aug. 18, 1953   3 Sheets-Sheet 1

INVENTOR.
Fred Thurmer

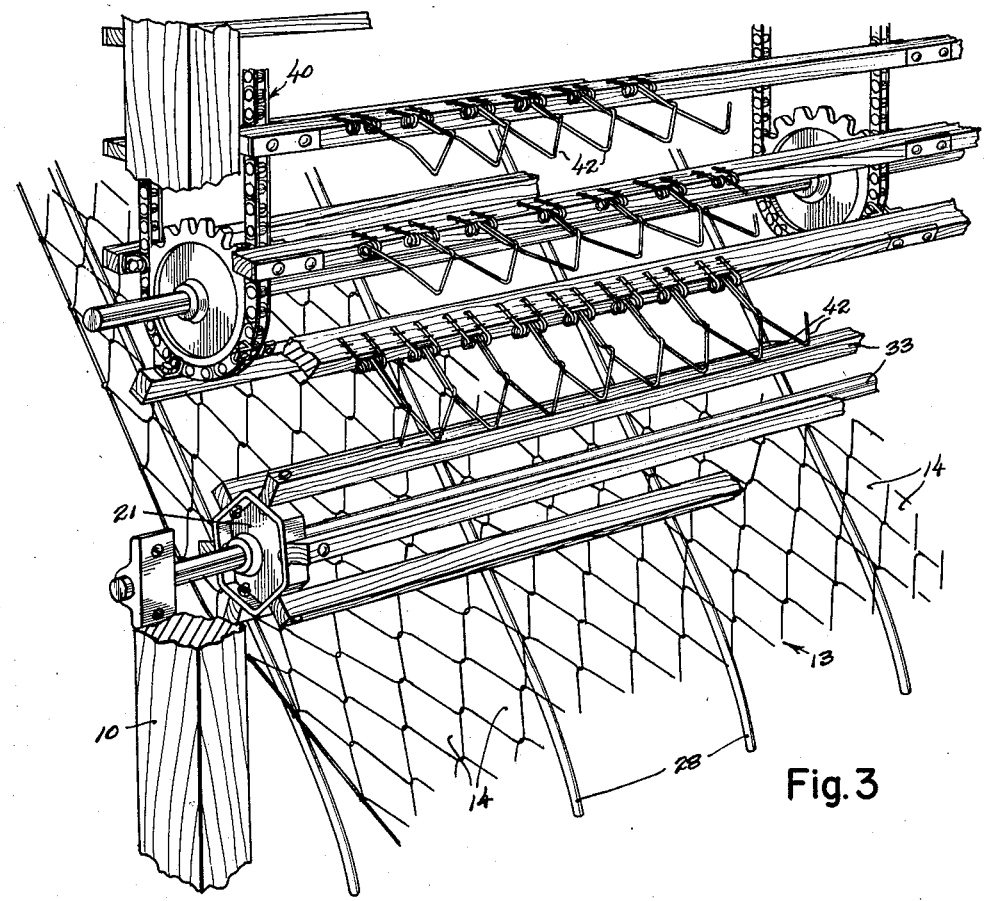
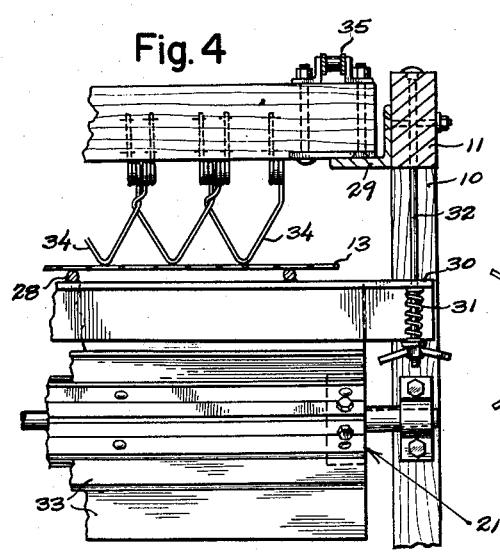
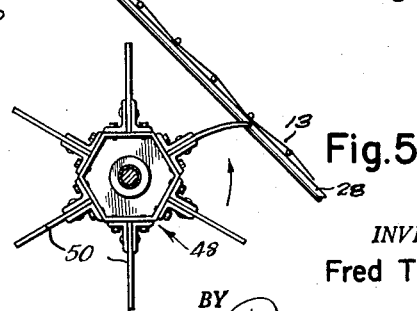
Fig. 3
Fig. 4
Fig. 6
Fig. 5
INVENTOR.
Fred Thurmer

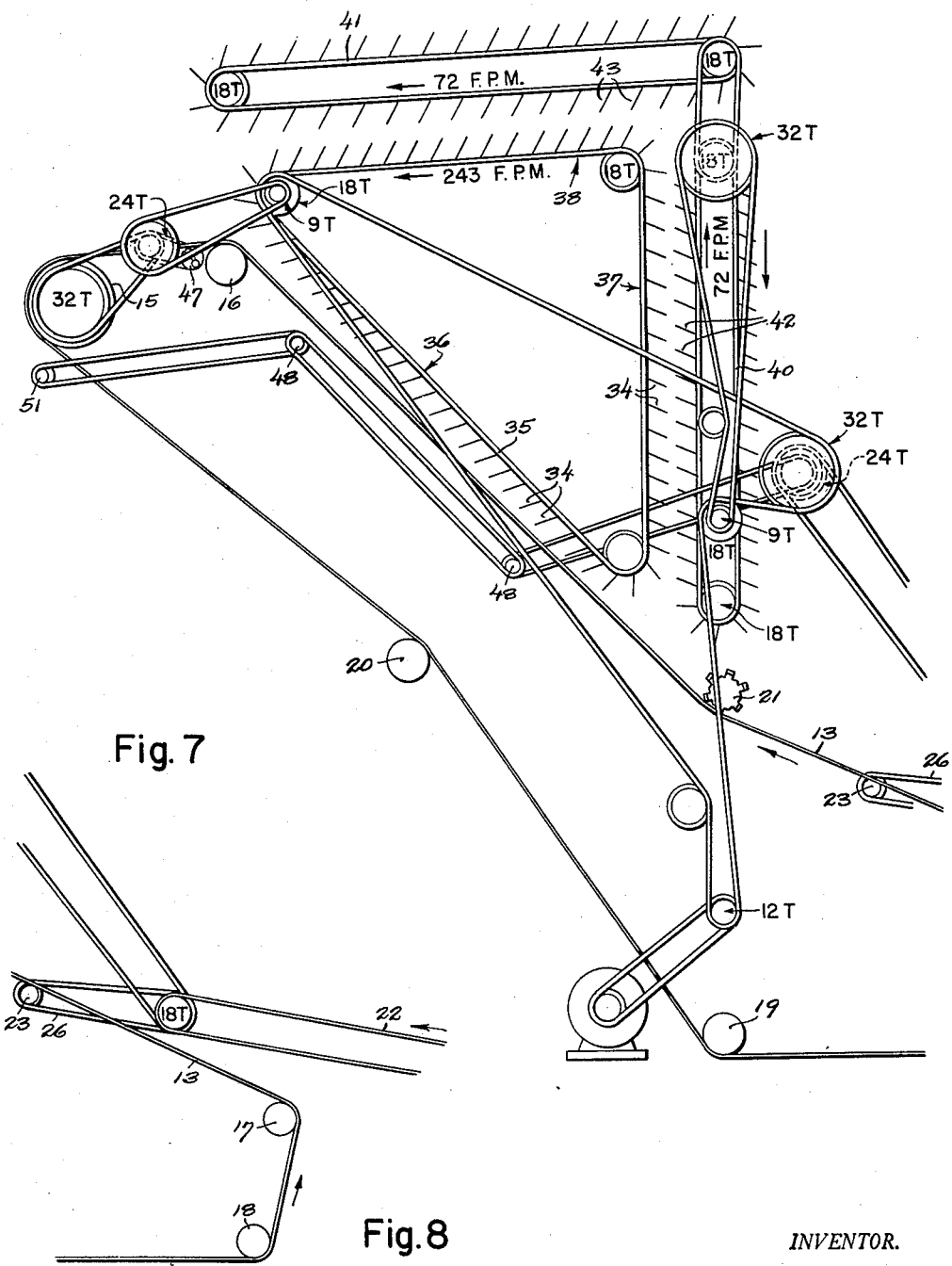

United States Patent Office 2,905,183
Patented Sept. 22, 1959

2,905,183

HOP PICKING MACHINE

Fred W. Thurmer, Yakima, Wash., assignor of one-half to Laurent Regimbal, Toppenish, Wash.

Application August 18, 1953, Serial No. 374,880

18 Claims. (Cl. 130—30)

This invention relates to the hop picking art, and pertains especially to that step of picking, commonly known as "arm picking," which is concerned with breaking down clusters to free the hop flowers from other contained matter—leaves, twigs, and the like—and which is distinguished from a step usually performed in advance of the arm picking, and namely the step of combing or stripping foliage-laden hop vines to divest the latter of substantially all its foliage. The arm-picking procedure has developed separate status within the art inasmuch as it is commonly performed by a separate machine peculiarly designed to accomplish the one particular function of picking hop flowers from the branches or arms of the hop vines and separating clustered flowers.

I and Laurent Regimbal have jointly perfected a machine intended particularly for performing the stripping work, and an application directed thereto has matured as U.S. Pat. No. 2,699,172, issued January 11, 1955. The present application has for its general object the provision of a perfected machine and method which, while it may be used to strip as well as pick and hence may be used independently of a vine-stripping machine, is primarily intended to complement a vine-stripping machine and pick the flowers after the foliage has been first stripped from the parent vine.

The present invention provides an endless open-mesh belt serving as a conveyor for the stripped foliage and employs in conjunction therewith a stripping mill composed of multiple opposed picking fingers to which the foliage is conveyed and which perform the function of breaking up clusters of flowers contained in the progressively moving foliage. Openings in the mesh belt are of a size to permit individual flowers to drop through the same. However, tributary twigs which remain attached to the floral stems of some of the flowers hang up on the wire strands of the belt and preclude the flowers from falling free. The prevailing practice has been to dislodge these hung-up flowers by providing below the belt substantial counterparts of the above-belt picking fingers, a procedure which has not been too satisfactory from the fact that when the flowers are caught in the openings of the belt they become localized in relation to the belt and should they evidence any major resistance to dislodgment the fingers then tend to tear the flowers and pull the petals away from the normally invested hop pistil.

A particular object of the present invention is to provide a machine embodying means by which these hung-up flowers which protrude below the belt are knocked free without, in so doing, subjecting the petals to any noticable tearing effect.

As a still further and particular object the invention aims to provide a hop-picking machine having the conveyor belt so trained as to describe a generally horizontal platform at the head end thereof operating as a receiving station for the foliage which is to be picked, and utilizing in conjunction with this platform a vibrating means functioning to shake down the foliage and accomplish two important ends, firstly that of reducing the bulk matter carried to the picking fingers by largely screening out such matter including free flowers as is already of a size admitting to passage through the openings in the mesh belt and secondly that of distributing the foliage more or less evenly upon the conveyor as a step preliminary to the conveyed travel of the foliage to the picking mill.

With the above and still additional objects and advantages in view looking in general to the perfecting of a machine for the described purpose, the invention consists in the novel construction and in the adaptation and combination of parts hereinafter described and claimed.

In the accompanying drawings:

Fig. 3 is a fragmentary enlarged-scale perspective viewing a portion of the machine from the vantage point shown by the lines 3—3 of Fig. 1.

Fig. 4 is a fragmentary vertical sectional view drawn to an enlarged scale on line 4—4 of Fig. 1.

Fig. 5 is a fragmentary enlarged-scale elevational view detailing one of several brush-heads which perform a sweeping function upon the open-mesh belt which carries hop-laden foliage.

Figure 1:
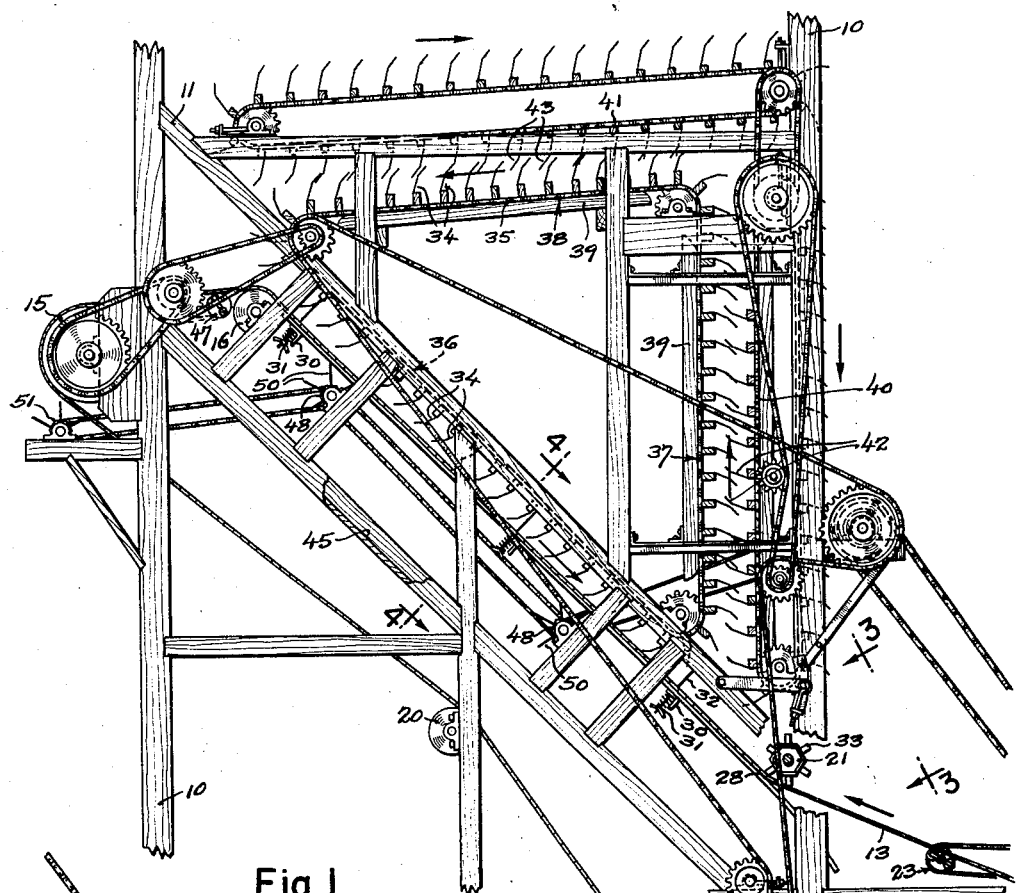
Figure 1 is a fragmentary side elevational view illustrating a machine constructed to embody the preferred teachings of the present invention.
Figure 2:
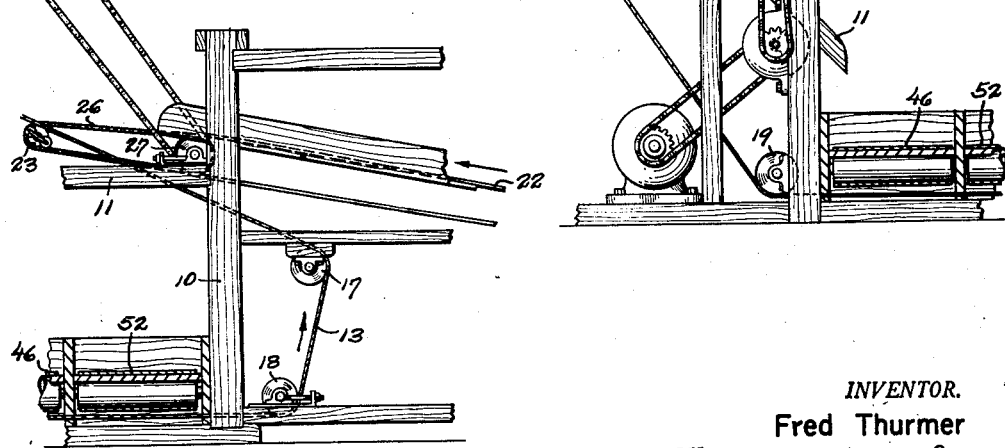
Fig. 2 is a fragmentary side elevational view portraying a head portion of the machine not visible in Fig. 1.

Fig. 6 is an enlarged-scale view illustrating the manner in which opposed picking fingers, provided along the opposite sides of a working throat suggesting a substantial "mill race," complement one another in performing their intended function of breaking up clusters of flowers and picking such flowers as well as leaves from tributary branches of a hop vine; and Figs. 7 and 8 are diagrammatic views illustrating the driving lay-out of the machine's moving parts.

Referring to said drawings, the framework of the machine is made rigid and is or may be of a skeletonized nature providing, along each side, a plurality of upright pieces designated by the numeral 10 connected one to another by longitudinal stringers 11 and also having suitable transverse ties extending from the uprights at one side to the uprights at the other side of the frame. While the teachings of the invention adapt themselves to use in a portable unit, the machine here illustrated is one intended as a permanent installation and is housed within a shed or the like from which it takes such added support as may be necessary or desirable to firmly anchor the frame.

The principal conveyor belt 13, and namely the belt which initially receives and gives travel to the bulk mass of stripped foliage, is of that nature commonly termed a "diamond-mesh," fabricated from wire to present rather wide openings 14 of a size admitting to the projection of hop flowers therethrough. The belt is endless and trained about a series of drums receiving a journal support from frame-carried bearing boxes for rotation about transverse horizontal axes, and of these drums one drum 15 is a live drum located at the tail-end extremity of the belt's upper-run travel while the others, indicated as five in number and designated by 16, 17, 18, 19 and 20, are idler drums. Special significance is attached to only the idler drums 16 and 17 which act one in complement with the other and with a freely journaled wheel 21 to guidably determine the upper-run travel of the belt. Drum 17 lies at the initiating or head end limit of said upper-run travel and occupies a level considerably below that of the live roller. The wheel 21, which will be hereinafter more particularly described, occupies a position overlying the belt between drums 16 and 17 in a horizontal plane well below that of the idler drum 16 but only slightly higher than that of the idler drum 17. The run of the belt between the drum 17 and the wheel 21 thus has only a minor slope and this moderately sloped section serves as a receiving platform and performs a primary screening function in respect of stripped foliage deposited thereon from a driven endless conveyor belt 22. The run of the belt from the idler drum 16 to the driving drum 15 is or may be horizontal, and this horizontal section, in a manner hereinafter described, performs a tertiary screening function and will be so termed. In contact with the underside of such receiving platform at a point more or less central to its length there is provided a vibrator or shaker device 23 comprised of a pair of transversely extending rollers carried by power-driven rotary end plates to occupy positions at diametrically opposite sides of the rotary axis. The rotary end plates receive their journal from the machine frame. A chain 26 working off a power-driven sprocket wheel 27 drives said shaker. The shaker's function is to shake down deposited bulk foliage and level and spread the latter upon the platform.

Proceeding beyond said receiving platform as the open-mesh belt passes under the wheel 21 and works toward the idler drum 16, the belt is given underlying support from a plurality of rather widely spaced longitudinal rails 28, and this section of the belt's travel will be hereinafter referred to as the secondary screening platform. Composed by preference of spring steel, said rails extend from substantially the head end to the extreme tail end of the sloped run, and receive yielding support from a plurality of transverse angle-iron bars 30 seating by their ends upon spring bumpers 31 carried by hanger rods 32. Now in reference to the wheel 21, the same suggests a substantial lantern pinion. The trundles 33 which it presents bear upon the upper surface of the belt and by friction of the latter impart turning motion to the wheel. The foliage, working under the lantern wheel and reaching the secondary screening platform, is there brought under the influence of multiple rows of V-shaped wire picking fingers 34 carried by the links of an endless chain 35 trained so as to move in a triangular orbit one sloped leg 36 of which overlies the secondary screening platform and converges slightly toward the latter so that the fingers are moderately spaced from the platform at the tail end thereof and brush the latter toward the head end thereof. A second leg 37 of the triangle rises more or less vertically from a point removed somewhat beyond the lantern wheel, and the remaining leg 38 runs in an approximately horizontal plane. The chain 35 travels at a relatively rapid rate of speed and in such a direction as causes the picking fingers to move counter to the travel of the screening belt as they pass over said belt in their traversal of the sloping leg 36. Substantial counterparts of the wire picking fingers 34 are carried by two other endless chains 40 and 41, and these latter chains are so trained that picking fingers 42 of the chain 40 oppose and lap the fingers 34 as the latter travel vertically along the leg 37, and picking fingers 43 of the chain 41 oppose and brush the fingers 34 as the latter travel horizontally along the leg 38. The picking fingers of the chains 40 and 41 travel in the same direction as the fingers 34 at a considerably lesser speed and I find it to be desirable that the rows of such slower moving fingers be given a wider spacing than that of the fast-moving fingers, say 6" c. to c. in respect of the rows of fingers 42 and 43 and 5" c. to c. in respect of the rows of fingers 34. The schematic disclosure of Fig. 7 indicates travelling speeds which I have found to be particularly satisfactory but such speeds are in no sense critical. Clarity in an understanding of the functioning of the picking fingers will perhaps be advanced by here stating that clumps of hop flowers moving beyond the lantern-wheel spreader 21 are caught up by the influence, both separately and combined, of the picking fingers 34 and 42, and fed thereby to the lower or entrance end of the vertical mill race described between the chains 35 and 40. The over-running travel of the spring-wire picking fingers 34 relative to the spring-wire fingers 42 produces continual loading and re-active unloading of the spring forces, snapping the fingers against the captive foliage to break clusters free from tributary limbs and separate the clusters into their component flowers. The action continues with lessened severity as the foliage clears the vertical mill race and enters the horizontal mill race described between the chains 35 and 41. At the discharge end of such horizontal mill race the separated parts of the foliage, and namely flowers, leaves and twigs, drop onto the tertiary screening platform. Twigs progress therefrom with the open-mesh belt and at the tail end of the tertiary screening platform drop off the latter onto a trash conveyor (not shown). The flowers pass through the openings 14 of the belt to the head end of a chute 45 which underlies both the tertiary and the secondary screening platforms and discharges from its lower end onto a belt conveyor 46 which runs transverse to the belt 13. There is provided below the tertiary screening platform a shaker 47 which is a substantial counterpart of the shaker 23.

As the mesh conveyor belt moves under the rows of picking fingers through that portion of its travel comprising the secondary screening platform, individual flowers are pulled free from the clusters and additional free flowers drop from the two mill races onto the secondary screening platform. These flowers together with a certain amount of leaves and twig fragments fall freely through the relatively wide openings in the mesh belt onto the chute 45. Other of the flowers will protrude through the openings in the belt but will not fall through, hanging up by reason of being still attached to short twig ends which catch upon the wire strands of the belt. To free these protruding flowers there are provided below the belt a spaced succession of power-driven rotary brush-heads 48, two being shown, each journaled to turn about a transverse horizontal axis and each carrying a plurality of circumferentially spaced radial sweeper-vanes 50 composed of soft rubber or other pliable material. The radial projection of these flaps is such that the tips graze the underside of the belt. Turning in directional correspondence but at an accelerated speed relative to the mesh conveyor the vanes extend substantially the full width of the mesh conveyor and are or may be unbroken throughout their length. A brush-head 51 similar to the heads 48 beats against the exposed face of the mesh conveyor belt after the latter has passed the power drum 15, this latter brush-head, however, being powered to turn in a direction converse to the belt. It will be noted that the conveyor 46 underlies only an after-part of the primary screening platform. Under the fore-part of this platform there is provided a separate conveyor 52. The significance of these two conveyors is that matter dropping through the openings of the mesh conveyor belt without traversing the picking fingers will contain less leaves and twigs so consequently will be graded higher if it is kept apart, for separate baling, from the product delivered by the chute 45 to the conveyor 46.

The invention and the manner of its operation should be apparent from the foregoing description of my now-preferred illustrated embodiment. Considerable changes in the details of construction can be resorted to without departing from the spirit of the invention and it is accordingly my intention that no limitations be implied and that the hereto annexed claims be given a construction fully commensurate with the broadest interpretation to which the employed language admits.

What I claim is:

1. In a hop picking machine, an endless mesh belt the openings in which are of a size to permit passage of hop flowers therethrough, said belt serving as a conveyor for foliage stripped from a hop vine and being trained about supporting drums to cause the upper run of the belt to travel an angular path one stretch of which is moderately sloped and the other stretch of which is steeply sloped, means for driving said belt to cause the belt in its upper-run travel to work progressively rising first along the moderately sloped stretch and then along the steeply sloped stretch, means for delivering the stripped foliage onto said moderately sloped stretch of the belt, means for vibrating the belt as it moves along said moderately sloped stretch for shaking down the delivered foliage, a procession of transverse rows of picker fingers overlying the steeply sloped stretch of the mesh belt and engaging stripped foliage travelling with the belt along said stretch, and brush means disposed below the mesh belt along said steeply sloped stretch acting upon the belt to break off foliaceous matter hanging through the meshes of the belt.

2. In a hop picking machine, an endless mesh belt the openings in which are of a size to permit passage of hop flowers therethrough, said belt serving as a conveyor for foliage stripped from a hop vine and being trained about supporting drums to cause the upper run of the belt to travel an angular path one stretch of which is moderately sloped and the other stretch of which is steeply sloped, means for driving said belt to cause the belt in its upper-run travel to work progressively rising first along the moderately sloped stretch and then along the steeply sloped stretch, means for delivering the stripped foliage onto said moderately sloped stretch of the belt, means for vibrating the belt as it moves along said moderately sloped stretch for shaking down the delivered foliage, a procession of transverse rows of picker fingers overlying the steeply sloped stretch of the mesh belt and engaging stripped foliage travelling with the belt along said stretch, picking throat rising vertically from above said stretch, picking throat rising vertically from above the lower or head end of said steeply inclined stretch, a picking throat extending horizontally from the upper end of said vertical picking throat to the tail end of said steeply sloped stretch of the belt, each of said throats being defined between opposed processions of forwardly moving picking fingers, and brush means disposed below the mesh belt along said steeply sloped stretch acting upon the belt to break off foliaceous matter hanging through the meshes of the belt.

3. In a hop picking machine, an endless mesh belt the openings in which are of a size to permit passage of hop flowers therethrough, said belt serving as a conveyor for foliage stripped from a hop vine and being trained about supporting drums to cause the upper run of the belt to travel an angular path one stretch of which is moderately sloped and the other stretch of which is steeply sloped, means for driving said belt to cause the belt in its upper run travel to work progressively rising first along the moderately sloped stretch and then along the steeply sloped stretch, means for delivering the stripped foliage onto said moderately sloped stretch of the belt, means for vibrating the belt as it moves along said moderately sloped stretch for shaking down the delivered foliage, a procession of transverse rows of picker fingers overlying the steeply sloped stretch of the mesh belt and engaging stripped foliage travelling with the belt along said stretch, a picking throat rising vertically from above the lower or head end of said steeply inclined stretch, and a picking throat extending horizontally from the upper end of said vertical picking throat to the tail end of said steeply sloped stretch of the belt, each of said throats being defined between opposed processions of forwardly moving picking fingers.

4. In a hop picking machine, an endless mesh belt the openings in which are of a size to permit passage of hop flowers therethrough, said belt being power-driven to serve as a conveyor for hop-bearing foliage and being trained about supporting drums for movement of an upper run of the belt along a given travel path, means for driving the belt, means for delivering the hop-bearing foliage onto the belt at the head end of said travel path, a procession of overhead picker fingers moving in a direction converse to the travel of the belt and engaging said foliage as it moves with the belt along said travel path, and a picking throat rising from above the belt at substantially one end of said procession of picker fingers and returning to the belt at substantially the other end of said procession of picker fingers, said picking throat being defined between opposed processions of forwardly moving picker fingers.

5. The hop picking machine of claim 4, means being provided by which the procession of picking fingers moving along one side of the picking throat are caused to travel at a speed accelerated from that of the procession of picking fingers moving along the other side of the throat.

6. The hop picking machine of claim 5 in which the processions of picking fingers are arranged in tranversely extending rows with the several rows in each procession spaced apart at uniform distances, and wherein the spacing between the procession of rows along one side of the throat differs from the spacing between the procession of rows along the other side of the throat.

7. A machine according to claim 1 in which residual matter lying loosely upon the belt after the belt has cleared said procession of picking fingers is caused to drop by its own weight off the belt as the belt initiates its lower-run travel, and brush means acting upon the belt in course of such lower-run travel to free foliaceous matter clinging to the belt.

8. Structure according to claim 7 in which the brushing elements of the recited brush means are comprised of pliable flap-like radial vanes.

9. In a hop picking machine, an endless mesh conveyor belt the openings in which are of a size to permit passage of hop flowers therethrough and arranged to have hop-bearing foliage delivered onto the head or initiating end of its upper run, means for driving said belt to give continuous unidirectional travel thereto, means for vibrating said foliage-receiving head end of the belt for shaking down the delivered foliage, a procession of transverse rows of picker fingers overlying the belt and moving in a direction converse to the travel of the belt and acting upon the foliage as the latter moves with the belt beyond said vibrating means, and opposing processions of transverse rows of picker fingers defining therebetween a picking throat rising from above the belt at substantially one end of said first-named procession of picker fingers and returning to the belt at substantially the other end of said first-named procession of picker fingers.

10. The machine of claim 9 having a substantial lantern wheel journaled for rotation between the vibrating means and the first-named procession of picker fingers and caused to be turned by frictional engagement of the belt with the trundles of said lantern wheel.

11. In a hop picking machine, an endless mesh conveyor belt the openings in which are of a size to permit passage of hop flowers therethrough and arranged to have hop-bearing foliage delivered onto its upper run, an endless driven carrier carrying a succession of transverse rows of picker fingers and trained for movement in a triangular orbit one leg of which so closely overlies the mesh belt as to bring the picker fingers into approximate brushing engagement with the belt, the fingers moving along the length of said leg in a direction converse to the travel of the belt and thence first rising from the belt as they traverse a second leg of the triangle and then returning to the belt as they traverse the third leg of the triangle, two complementing endless driven carriers each carrying a succession of transverse rows of picker fingers and trained so that one run of one said complementing carrier parallels the second leg of the triangle with its picker fingers substantially lapping the fingers moving with the first-named carrier along said second leg and so that one run of the other said complementary carrier parallels the third leg of the triangle with its picker fingers approximately brushing the fingers moving with the first-named carrier along said third leg.

12. The machine of claim 11, means being provided by which said fingers of the complementing carriers move in the same direction but at a speed slower than the fingers of the first-named carrier.

13. The machine of claim 11, means being provided by which the fingers of the complementing carriers move in the same direction as the fingers of said first-named carrier with the speeds being in the ratio of approximately 1 to 3.

14. In a hop picking machine, an endless mesh conveyor belt the openings in which are of a size permitting passage of hop flowers therethrough and trained to cause the upper run of the belt to slope upwardly, means for driving said belt to cause the belt to ascend said slope, means for delivering hop-carrying foliage onto said belt at the lower end of the slope, means for shaking down the foliage as it is delivered to the belt, a conveyor belt underlying said shaking means and running in a direction transverse to the belt for picking up foliaceous matter shaken through the meshes of the mesh belt, picking means acting upon the foliage as it moves with the belt up said slope for breaking up the foliage, means disposed below said picking means and acting upon the underside of the mesh belt to break off foliaceous matter hanging through the meshes of the mesh belt, and a collecting chute located below said last-named means.

15. The machine of claim 14 having a transversely disposed conveyor belt located alongside and independent of the first-named transversely disposed conveyor belt for receiving foliaceous matter collected by the chute.

16. In a hop picking machine, an endless mesh conveyor belt the openings in which are of a size to permit passage of hop flowers therethrough and trained so that its upper run traverses first a moderately sloped stretch, then a more steeply sloped stretch, and finally a comparatively flat stretch, means for driving the belt, a receiving conveyor belt extending transverse to the mesh belt below said moderately sloped stretch, a chute underlying both the steeply sloped and moderately flat stretches and feeding to said receiving conveyor belt, means delivering hop-carrying foliage onto said moderately sloped stretch of the mesh belt, an endless driven carrier carrying a succession of transverse rows of picker fingers and trained for movement in a triangular orbit one leg of which closely overlies the steeply sloped stretch of the mesh belt with the fingers approximately brushing the mesh belt, the fingers moving along said steeply sloped stretch in a direction converse to the travel of the mesh belt and thence rising from the belt as they traverse a second leg of the triangle and then returning to the flat stretch of mesh belt as they traverse the third leg of the triangle, two complementing endless driven carriers each carrying a succession of transverse rows of picker fingers and trained so that one run of one said complementing carrier parallels the second leg of the triangle with its picker fingers substantially lapping the fingers moving with the first-named carrier along said second leg and so that one run of the other said complementary carrier parallels the third leg of the triangle with its picker fingers approximately brushing the fingers moving with the first-named carrier along said third leg.

17. The method of picking hop flowers from hop-carrying foliage which comprises providing a picking throat defined between paralleling runs of two endless belts each carrying a succession of transverse rows of picking fingers and with the fingers of the two belts being in lapping opposition along the length of the throat, feeding the foliage into one end of the throat, and powering the two belts to cause the opposing fingers to both travel along the throat toward the other end but at different speeds, thus tumbling the foliage while at the same time conveying the same from the one to the other said end of the throat.

18. The method of picking hop flowers from hop-carrying foliage which comprises providing a picking throat defined between runs of two endless belts and with the throat interrupted by opposing picking fingers carried by the belts, feeding the foliage into one end of the throat, and giving such travelling motion to the two belts as will cause the belts to move at different speeds toward the other end of the throat.

References Cited in the file of this patent
UNITED STATES PATENTS

| | | |
|---|---|---|
| 2,187,526 | Thys | Jan. 16, 1940 |
| 2,226,813 | Gray | Dec. 31, 1940 |
| 2,336,280 | Miller | Dec. 7, 1943 |
| 2,587,604 | Dauenhauer | Mar. 4, 1952 |